United States Patent [19]
Graham

[11] Patent Number: 4,974,547
[45] Date of Patent: Dec. 4, 1990

[54] BIRD AND ANIMAL FEED FEEDER, AND FEED CONTAINER

[76] Inventor: Shirley L. Graham, 9891 Baltimore National Pike, Ellicott City, Md. 21043

[21] Appl. No.: 147,852

[22] Filed: Jan. 25, 1988

[51] Int. Cl.$^5$ ............................................. A01K 39/01
[52] U.S. Cl. ..................................... 119/52.2; 119/52.3
[58] Field of Search ...................... 119/51 R, 52 R, 23, 119/18

[56] References Cited

U.S. PATENT DOCUMENTS

| | | | |
|---|---|---|---|
| 905,278 | 12/1908 | Benefiel | 119/52 R X |
| 1,894,406 | 1/1933 | Lenhart | 119/23 |
| 3,066,648 | 12/1962 | Kohlhauf | 119/18 |
| 3,568,641 | 3/1971 | Kilham | 119/51 R |
| 3,742,914 | 7/1973 | Spencer et al. | 119/52 R |
| 4,259,927 | 4/1981 | Clarke | 119/51 R |
| 4,327,669 | 5/1982 | Blasbalg | 119/51 R |
| 4,442,793 | 4/1984 | Overpeck et al. | 119/23 |
| 4,712,512 | 12/1987 | Schreib et al. | 119/51 R X |

FOREIGN PATENT DOCUMENTS 339680 12/1930 United Kingdom ................... 119/23
390329 4/1933 United Kingdom ............. 119/51 R Primary Examiner—John Weiss
Assistant Examiner—Nicholas D. Lucchesi
Attorney, Agent, or Firm—L. A. Scholz

[57] ABSTRACT

A combined bird and animal feed container; with a choice of either a glossy smooth (squirrel resistant) or a textured (animal inviting) finish, to the ceramic or plastic container material, which material is weather and freeze proof. The feeder has an upright substantially cylindrical housing, which has a recessed bottom opening for receiving of a supply of bird feed such as seeds and the like, and, thru the choice of smoothness of external surface of said housing, adapting the feed container selectively for birds exclusively, or for birds, squirrels and the like. There are a plurality of transverse horizontal openings in the wall of said housing forming partial tunnels to afford protected access to the feed supply. Below each tunnel is pierced an opening to receive a selectively flexible perch. A flexible cable or strand at the housing's upper end supports or hangs the feeder.

8 Claims, 1 Drawing Sheet

U.S. Patent
Dec. 4, 1990
4,974,547
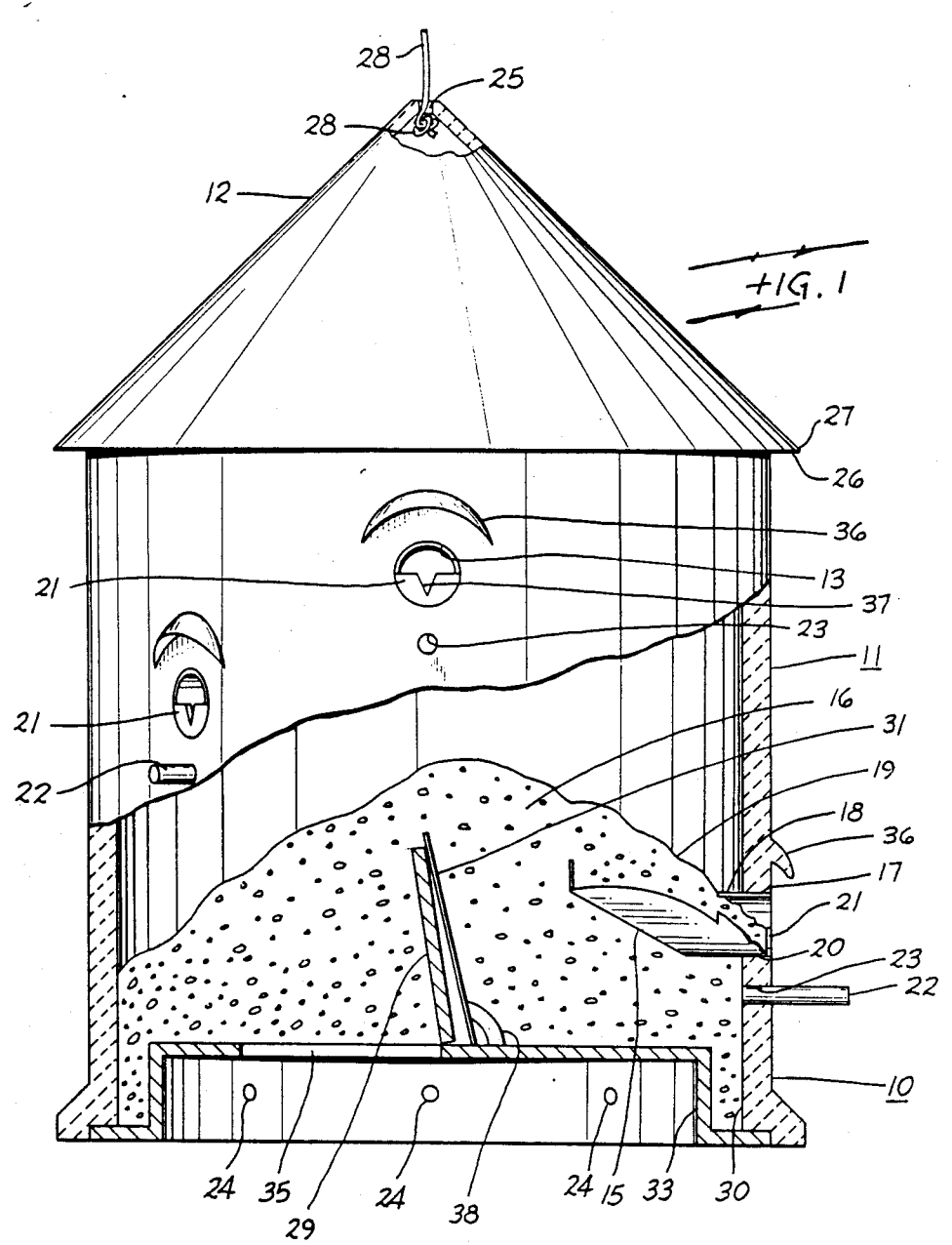
FIG. 1
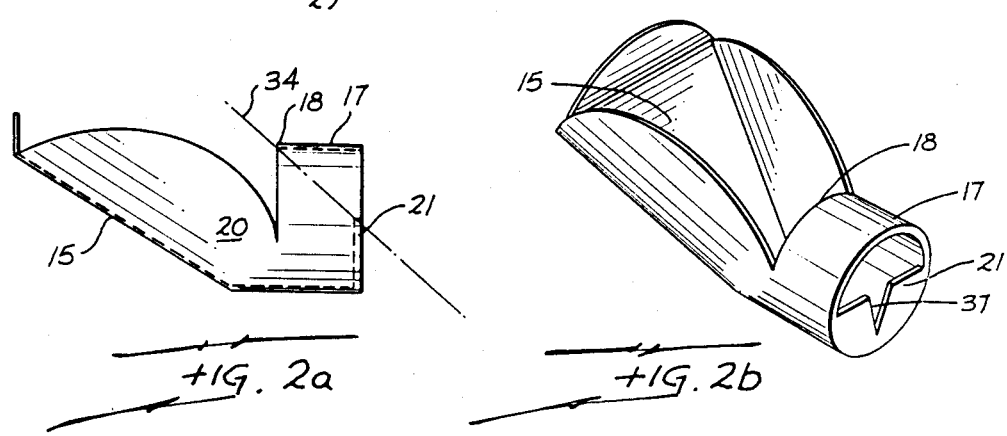
FIG. 2a
FIG. 2b

BIRD AND ANIMAL FEED FEEDER, AND FEED CONTAINER

BACKGROUND OF THE INVENTION

The present invention relates to bird and animal feed containers in general, and more particularly to improvements in bird feed and squirrel feed containers.

Man has had a desire to help feed birds only, or selectively the birds and squirrels and thus attract birds to the areas where he lives. Specially this desire is manufactured when the weather is inclement or other hard times are present. An elevated feed device of those known in the art is customarily the method of helping the birds and helping to attract the birds. Quite a number of hanging bird feeders have been developed and some of them even patented. Each design and structure in the past has certain advantages and examples of some of these are shown in the U.S. Patents listed below:

| | |
|---|---|
| 4,242,984 | 6 Jan 1981 |
| 4,570,575 | 18 Feb 1986 |
| 4,034,715 | 12 Jul 1977 |
| 4,019,462 | 26 Apr 1977 |

Each of the above listed patents has also some disadvantages and thus suffers by comparison and the subject invention, when considering the purposes and desired functions of the subject invention.

OBJECTS AND SUMMARY OF THE INVENTION

An object of the invention is to provide a novel and improved bird and or selectively an animal and bird feeder. An object of the invention is to provide a repeatedly bottom filling bird feeder, wherein the first feed in the feeder, is the first feed used, after the new feed is added, to refill the feeder. An object of the invention is to provide a bird perch of selective flexibility to provide for an automatic method of perch bending, so as to position the head of the alighting bird in closer proximity to the partial tunnel feed access. This action is responsive to the size and therefore approximate weight of the bird.

An object of the invention is to provide a selectively squirrel proof bird feeder, or a squirrel and bird feeder that is freeze proof.

An object of the invention is to provide a rain proof, weather resistant, controlled feeding, eye pleasing, feeder which shields the presented feed from the weather elements and is conveniently accessible to a bird.

The invention is embodied in a combined bird feeder container, and bird feeder, which comprises a substantially hollow vertical walled enclosed feed housing, serving to store a supply of bird feed, such as seeds and feed pellets. The feeder includes an upper roof portion and a lower walled portion. The lower portion has at least one partial tunnel or shaped cavity transverse of said vertical wall, having an opening with a bumper or curb accessible to the exteriors surrounds, and an interior curb on an elevated sloping floor to direct the feed in a controlled manner so as to make it accessible to a bird perched on a perch located exteriorly in spaced relationship to the partial tunnel access.

The container 10 holds seeds that are loaded by turning the container upside down and adding feed seeds through the opening 35 in the bottom, and then returning the container to the upright position. After righting the container 10 the birds can get to the feed in the dispensing partial tunnels. The supply of feed in the lower portion of the container is replenished (in the upright position) by gravity flow from the seed stored in the upper portion of the housing. The lower portion of the housing is provided with a vertical baffle interiorly of the container housing to evenly divide the seed flow between a plurality of tunnels. A hinged tab also returns automatically by gravity, upon righting the container, and covers the refill opening. The feeder is additionally supplied with a cable or strand thru the upper cone like roof portion, to allow hanging the feeder, in a known manner. Each of the plurality of partial tunnels has spaced below, a flexible rod shaped perch extending radially from the housing vertical axis. The housing and the partial tunnels exteriors are all made of glass or glazed ceramics, china, or greenware; so that the smooth slick glass-like surface prevents squirrels, chipmunks, and similar animals from successfully gripping the housing, in order to access the feed available in the exterior portion of the partial tunnels, and rob and feeder of the seed contained therein. Certain plastics such as Teflon (Du Pont trade mark) Lucite and similar plastics can be substituted for the ceramics or glass.

A feeder designed for feeding squirrels and the like kind of animals, is provided with a textured exterior surface on the roof and external walls of the feed container. The perches, which are flexible and slick for the bird only feeder, are made of a more rigid and rough material to provide a firm footing for the squirrel to grip.

The novel features which are considered as characteristic of the invention are set forth in particular, in the claims appended hereto and made a part hereof.

The improved bird feeder itself, however both as to its construction and its function and mode of using, together with the additional features and advantages will be best understood upon perusal of the following detailed description of certain specific selected embodiments with reference to the accompanying drawings.

BRIEF DESCRIPTION OF THE DRAWINGS

FIG. 1 is a front elevation (partially cut away) view of the bird feeder, the subject invention.

FIG. 2a is a detail in elevation of the partial tunnel unit.

FIG. 2b is a detail in perspective of the partial tunnel unit.

DESCRIPTION OF THE PREFERRED EMBODIMENTS

The drawings show a combined bird feed container and bird feeder 10 which is comprised of a lower wall portion of the feed container 10 forming an elongated substantially cylindrical housing wall 11, or bird feeder body. This body has an upper of roof portion of the feed container formed as a convex or conical 12. The cylindrical housing 11 is penetrated by one or more openings 13 radially penetrating the cylindrical wall 11 perpendicular to the vertical axis of the feeder body 10. The bird feeder is preferably made of ceramic, china or plastic or other weather resistant material that is capable of selectively being finished with a gloss or textured exterior surface.

Each of the openings 13 has inserted within it, a partial tunnel 14 which is shaped somewhat like an elbow pipe or a truncated tobacco smoking pipe, substantially as shown, said pipe or partial tunnel 14 has at the inner end a vertically tilted sloping floor receiver 15 with an opening to receive the bird seed or feed 16 by the action of gravity. The feed 16 comes from the interior of the feeder body 10; and flows in the neck portion of the curved pipe-like partial tunnel, 14. On the upper side of the interior of said tunnel tube 17 is an inwardly projecting seed flow baffle 18 projecting inwardly far enough to limit the natural fall curve or line of the upper surface 19 of the following exiting seed, being fed by gravity. This limits the extent that the feed, through the natural fall, will only reach the front of the feed presenter 20 and not spill over. At the external portion of the partial tunnel device 14 there is the seed presenter 20 shaped to present the seed toward a seed stop 21 to act as a dam arranged to keep the seed from spilling out of the presenter 20 and on the ground. The presenter has a drain notch 37 that drains any wind driven water from this presentation area. Also, as part of each seed presenter, there is a drip cap 36 which acts like an eyebrow and sheds the rain that would otherwise flow down the outer surface of the wall 11 and into the seed presenter. Each of these partial tunnel devices has in spaced relation below them a perch 22 inserted in a pierced opening 23 in the exterior of the feeder body wall 11.

As a part of the top of the bird feeder structure there is a generally dome shaped or convex or conical shaped roof 12 having an eyelet 25 at the top or apex of said roof and having eaves 26 that extend the sloping portion 27 of the roof to generally protect the partial tunnels 14. The roof eyelet 25 has a knotted cable, strand or other flexible shaft-like material 28 inserted therethru for use as a feeder attaching or hanging means.

The perches 22 mounted fixedly in openings 23 are either a wound spring, or other flexible substance such as Nylon in a long cylindrical form, of a stiffness sufficient to support the heavier birds in a bent position or the lighter birds in a comparatively more straight position so that the head of the bird will be approximately level with the partial tunnel 20 feed presenting opening. The divider or seed diverter 31 is positioned at an acute angle with the axis of the feed container 10 so that it prevents the hinged cover 29 from opening away from the bottom opening 30 further than about 80 degrees from the plane of the bottom of the feeder. This divider also serves to distribute the feed at the bottom of the bird feeder 10 in two substantially equal portions for presentation to the partial tunnels 14.

Located centrally at the lower portion of body 11 of the feeder 10 in the interior portion of the feed container is the said slightly tilted baffle or diverter 31 which, after filling the feeder in the inverted position, and then returning it 10 to the upright position, in combination with the pivoted closer or hinged cover 29 automatically returns the closer or cover, by means of the tabs 38, the pivoted closer 29 to the closed position. Filling, in the inverted position of the feeder body 10 is simplified to a great extent by the recessed opening or funnel like bottom assembly structure 32 provided in the base of the feeder body 10. The diverter 31 and the closer 29 are all carried on the base plate 33 that fits selectively attachable within the recess 30 and forms the bottom assembly 32. The assembly 32 has one or more vent holes 24 that serve to provide a limited amount of ventilation for the seeds 16 in the container. In filling the feeder 10, it turned up side down and then the sloping floor 15 of the partial tunnels 14 instead of assisting in directing the feed toward the presentation area baffle 18, as it does in the upright position; now diverts the feed away from the presentation areas and prevents accidental spillage of the newly added feed or the prior placed seed, while filling.

The foregoing is representative of a preferred forms of the invention. It is to be interpreted in an illustrative rather than a limiting sense.

I claim:

1. In a bird or animal feeder or feed container the improvement comprising,
    a. a container means heaving an upper roof portion of convex shape, a lower wall portion of substantially cylindrical shape, and a bottom wall portion with a selectively closeable recessed filler opening means located in said bottom wall portion thereof for filling the said feed container,
    b. said container means having at least one larger and one smaller annular opening means located about said lower wall portion with the larger annular will opening means spaced vertically above the smaller annular wall opening means and a partially tubular feed presenting means which is located within each of said larger wall opening means and having an opening at one end of said feed presenting means, said tubular feed presenting means having a controller means, said controller means comprising an upper interior feed stop, closely adjacent a wall section and a lower exterior feed stop forming a portion of the outer wall, and in conjunction therewith to provide a controlled presentation of the feed substance at a reachable distance from the bird or animal,
    c. a perch means, which is attached within said smaller annular wall opening means and extends out and down from said lower wall portion approximately the width of the animal for which the feeder perch is intended to support.

2. In a device as in claim 1, wherein said container means is made of a substantially clay-like substance having a glossy or slippery external surface formed to prevent squirrels from obtaining a secure purchase on the feeder.

3. In a device as in claim 1, wherein said selectively closeable opening means is restrained against opening more than 80 degrees by a tab opening restricting means.

4. In a device as in claim 1, wherein said feed presenting means has exteriorly of the lower wall a seed stop to restrict the outward flow of seeds and retain them in the outer end of the feed presenting means for animal or bird consumption.

5. In a bird or animal feeder feed container the improvement comprising:
    a. container means having an upper roof portion of convex shape, a lower wall portion of substantially cylindrical shape and a bottom wall having a selectively opening, inwardly swinging, and recessed filling opening, closure means located therein,
    b. a stop means associated with said door, to stop or limit to a predetermined distance the amount of opening of said door,
    c. said container means having at least one annular larger wall opening means located in said lower wall, and a feed presenting means, located partially within said larger wall opening means, to provide a controlled presenting of the contained feed of said feed container.

d. said container means also having in spaced relationship below said larger wall opening means, a smaller wall means opening means located in said lower wall means and a perch means, located and rigidly attached partially within said smaller wall opening means, 6. A device as in claim 5, wherein said feed presenting means has as an inner portion thereof an inwardly and upwardly sloping planar diverter element, said diverter element presenting a slope of approximately 45 degrees with the vertical axis of the feeder.

7. A device as in claim 5, wherein said feed presenting means has an outer portion thereof formed as a partial vertical feed stop wall, contiguous with and extending horizontally across the lower one third of the feed presenting area.

8. A device as in claim 5, wherein said feed presenting means has a vertical feed stop wall, which vertical feed stop wall has perforated thru the center thereof a downwardly depending slot approximately two thirds the way down from the vertical feed stop wall's top horizontal lip.

* * * * *